US012775800B2

(12) United States Patent
Krabach et al.

(10) Patent No.: US 12,775,800 B2
(45) Date of Patent: Oct. 27, 2026

(54) PROMPT COMPILER

(71) Applicant: Microsoft Technology Licensing, LLC, Redmond, WA (US)

(72) Inventors: Brian Scott Krabach, Snohomish, WA (US); Paul Robert Payne, Seattle, WA (US); Samuel Edward Schillace, Portola Valley, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 162 days.

(21) Appl. No.: 18/755,543

(22) Filed: Jun. 26, 2024

(65) Prior Publication Data

US 2026/0004072 A1 Jan. 1, 2026

(51) Int. Cl.
*G06F 17/00* (2019.01)
*G06F 40/284* (2020.01)

(52) U.S. Cl.
CPC .................................. *G06F 40/284* (2020.01)

(58) Field of Classification Search
None
See application file for complete search history.

(56) References Cited

U.S. PATENT DOCUMENTS

| | | | | |
|---|---|---|---|---|
| 11,294,939 | B2 * | 4/2022 | Malhotra | H04L 63/04 |
| 12,067,366 | B1 | 8/2024 | Heller | |
| 12,493,772 | B1 | 12/2025 | Cameron | |
| 2019/0259293 | A1 | 8/2019 | Hellman et al. | |
| 2021/0042662 | A1 * | 2/2021 | Pu | G06N 20/00 |
| 2024/0289561 | A1 | 8/2024 | Qadrud-Din | |
| 2024/0330603 | A1 | 10/2024 | Tu | |
| 2024/0386040 | A1 * | 11/2024 | Lee | G06F 16/3329 |
| 2025/0028967 | A1 * | 1/2025 | Cai | G06N 3/08 |
| 2025/0110975 | A1 | 4/2025 | Shea | |

(Continued)

FOREIGN PATENT DOCUMENTS

CN 117312523 A 12/2023

OTHER PUBLICATIONS

Ma, et al., "An Iterative Optimizing Framework for Radiology Report Summarization With ChatGPT", In Proceeding of IEEE Transactions on Artificial Intelligence, vol. 5, Issue No. 8, Aug. 2024, pp. 4163-4175.

(Continued)

*Primary Examiner* — Satwant K Singh
(74) *Attorney, Agent, or Firm* — Alleman Hall LLP

(57) ABSTRACT

A computing system including memory storing a prompt library. The prompt library includes prompt fragments and prompt templates. The computing system further includes one or more processing devices configured to, at a prompt compiler, receive a prompt generation input including prompt input data. At the prompt compiler, based at least in part on the prompt input data, the one or more processing devices are further configured to select a prompt template and one or more of the prompt fragments from the prompt library. The one or more processing devices are further configured to fill the selected prompt template with the prompt input data and the one or more selected prompt fragments to compute a compiled prompt. At a first machine learning model, the one or more processing devices are further configured to process the compiled prompt and to output the machine learning model output.

18 Claims, 10 Drawing Sheets

(56) References Cited

U.S. PATENT DOCUMENTS

| | | | | |
|---|---|---|---|---|
| 2025/0111169 | A1 | 4/2025 | Srinivasan | |
| 2025/0131192 | A1 | 4/2025 | Miller | |
| 2025/0156638 | A1 | 5/2025 | Shen | |
| 2025/0259362 | A1 * | 8/2025 | Brooks | G06F 40/166 |
| 2025/0307289 | A1 | 10/2025 | Frederik | |
| 2025/0348331 | A1 * | 11/2025 | Scheuermann | G06F 9/451 |
| 2025/0348674 | A1 * | 11/2025 | Borse | G06N 3/0475 |
| 2025/0371356 | A1 | 12/2025 | Junxiang | |
| 2025/0373458 | A1 * | 12/2025 | Saleh | H04L 12/1822 |
| 2026/0004078 | A1 | 1/2026 | Krabach | |

OTHER PUBLICATIONS

Non-Final Office Action mailed on Feb. 23, 2026, in U.S. Appl. No. 18/755,573, 36 pages.

Clariso, et al., "Model-Driven Prompt Engineering", IEEE, In Proceeding of 26Th International Conference on Model Driven Engineering Languages and Systems, Oct. 1, 2023, pp. 47-54.

Garg, et al., "Improving Code performance using LLMs in Zero-Shot: RAPGen", In Repository of arXiv:2306.17077v2, Mar. 28, 2024, 12 Pages.

International Search Report and Written Opinion received for PCT Application No. PCT/US2025/019659, mailed on Jun. 5, 2025, 10 pages.

International Search Report and Written Opinion received for PCT Application No. PCT/US2025/021223 mailed on Jun. 30, 2025, 14 pages.

Pan, et al., "Plum: Prompt Learning using Metaheuristic", In Repository of arXiv:2311.08364v2, Mar. 14, 2024, 27 Pages.

Final office Action mailed on Jul. 29, 2026, in U.S. Appl. No. 18/755,573, 39 pages.

* cited by examiner

PROMPT COMPILER

BACKGROUND

Prompt engineering is the process of constructing a prompt as an input to a machine learning model in order to receive a desired type of output. The machine learning model is typically a large language model (LLM) or large multimodal model (LMM), and the user typically writes the prompt in the form of natural language instructions. When the machine learning model processes the prompt, the prompt may be used as context for which the machine learning model generates a completion. The user may accordingly prompt the machine learning model such that completions of the prompt are likely to have specific contents and/or structures. Prompt engineering is still a relatively new field of endeavor. Particularly since generative machine learning models have grown more powerful and complex, technical challenges remain for improvement of prompt engineering techniques, as discussed in detail below.

SUMMARY

To address the issues discussed herein, according to one aspect of the present disclosure, a computing system is provided, including memory storing a prompt library. The prompt library includes a plurality of prompt fragments and a plurality of prompt templates. The computing system further includes one or more processing devices configured to, at a prompt compiler, receive a prompt generation input including prompt input data. At the prompt compiler, based at least in part on the prompt input data, the one or more processing devices are further configured to select a prompt template and one or more of the prompt fragments from the prompt library. The one or more processing devices are further configured to fill the selected prompt template with the prompt input data and the one or more selected prompt fragments to compute a compiled prompt. At a first machine learning model, the one or more processing devices are further configured to process the compiled prompt to compute a machine learning model output. The one or more processing devices are further configured to output the machine learning model output.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Context window sizes of some machine learning models have recently grown to be able to accommodate tens of thousands, hundreds of thousands, or even over a million tokens. When using a machine learning model with a large context window, the user may enter a correspondingly long prompt, referred to below as a megaprompt. For example, these large context windows may be used to summarize large volumes of text or to refer to records of a user's prior interactions with a machine learning model or other software.

Expanded context windows present machine learning model users with opportunities to exercise more precise control over model behavior by including additional instructions in the prompt. However, a user performing conventional prompt engineering may have to go through a lengthy process of adding information to the prompt in order to make use of the capabilities provided by a large context window. For example, when a user inputs a large body of text into the context window of a machine learning model, it may be time-consuming for the user to pre-process that input text into a form that reflects the user's intentions for how that text is processed at the machine learning model. Thus, conventional prompt engineering techniques may be cumbersome to use when composing megaprompts.

In addition to the above challenges related to megaprompts, the user may also be unaware of how to reliably elicit specific behaviors from the machine learning model. Since prompt engineering is used to instruct machine learning models to perform a wide variety of tasks, prompting strategies for only a small fraction of those tasks are likely to be known to any given user. Effective prompt engineering strategies may also differ between machine learning models.

Figure 1:
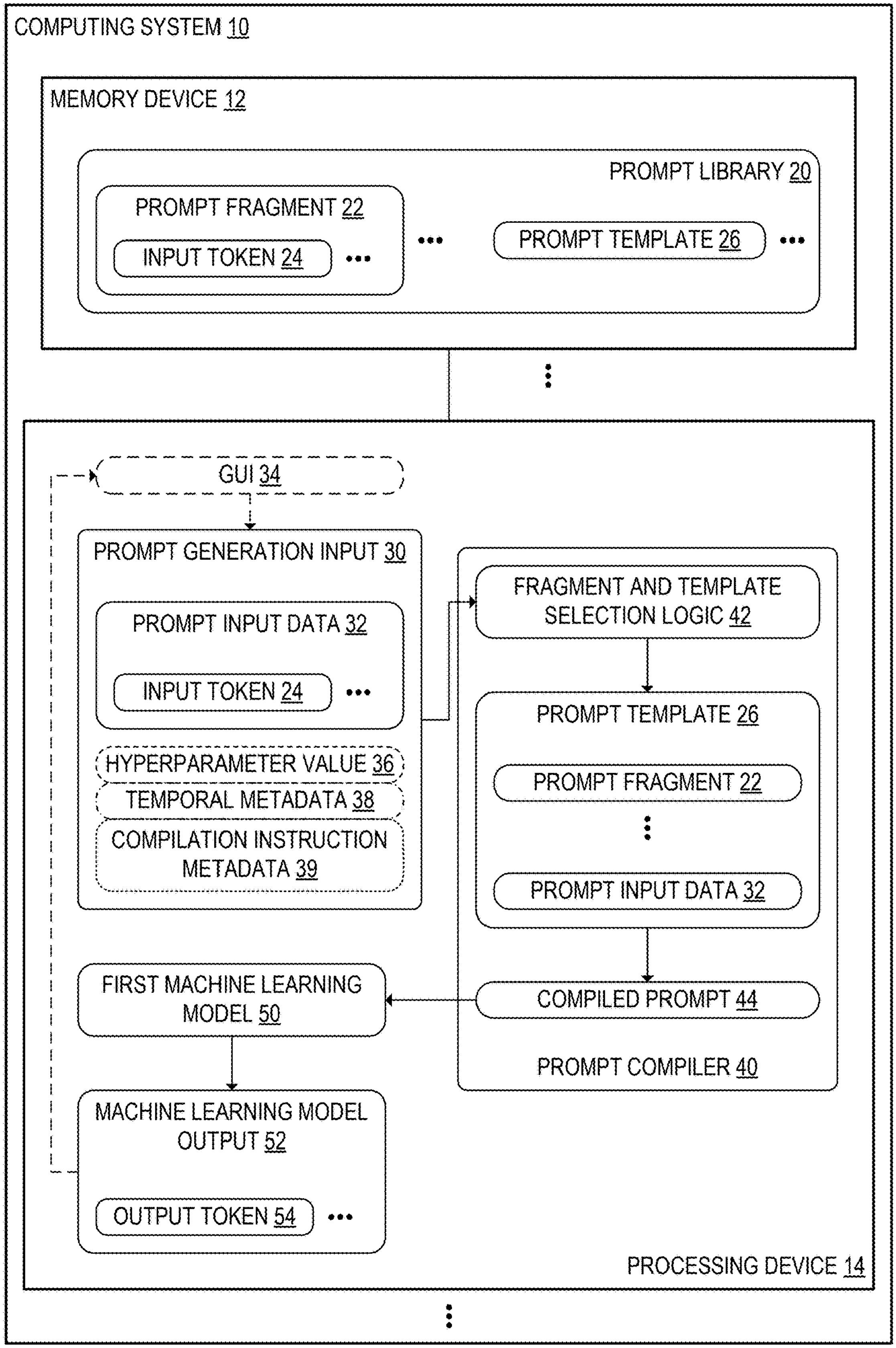
FIG. 1 schematically shows a computing system including one or more processing devices configured to compile a prompt for a first machine learning model, according to one example embodiment.

In order to address the above shortcomings of current approaches to prompt engineering, a computing system 10 is provided, as schematically depicted in the example of FIG. 1. In the example of FIG. 1, the computing system 10 is shown when generating a compiled prompt 44 and processing that compiled prompt 44 at a first machine learning model 50. The computing system 10 includes one or more memory devices 12 and one or more processing devices 14. The one or more memory devices 12 may, for example, include one or more volatile memory devices and one or more non-volatile storage devices. The one or more processing devices 14 may, for example, include one or more central processing units (CPUs), graphics processing units (GPUs), neural processing units (NPUs), and/or other types of hardware accelerators.

In some examples, the one or more memory devices 12 and/or the one or more processing devices 14 may include a plurality of physical components distributed among a plurality of different physical computing devices. For example, the one or more memory devices 12 and/or the one or more processing devices 14 may be included in a networked system of multiple physical computing devices located in a data center. Portions of the functionality of the one or more memory devices 12 and/or the one or more processing devices 14 may additionally or alternatively be performed at one or more client computing devices.

As shown in the example of FIG. 1, the one or more memory devices 12 store a prompt library 20 including a plurality of prompt fragments 22. The prompt fragments 22 are portions of prompts from which the compiled prompt 44 may be constructed, as discussed in further detail below. Each of the prompt fragments 22 may include one or more input tokens 24. In addition, the prompt library 20 stores a plurality of prompt templates 26. The prompt templates 26 specify respective structures into which the prompt fragments 22 are arranged when prompts are generated.

The one or more processing devices 14 are configured to receive a prompt generation input 30 including prompt input data 32. The prompt input data 32 is data that is indicated for inclusion in the compiled prompt 44. For example, the prompt input data 32 may be a user input that is entered at a graphical user interface (GUI) 34. In other examples, the prompt input data 32 may be programmatically selected. For example, a body of text may be programmatically summarized at a regular interval as additional text is added. The prompt input data 32, similarly to the prompt fragments 22, may include a plurality of input tokens 24. In examples in which the first machine learning model 50 is a multimodal model, other types of input data, such as image data, audio data, and/or video data, may additionally or alternatively be included in the prompt input data 32.

Other data may also be included in the prompt generation input 30. In some examples, the prompt generation input 30 may further include respective hyperparameter values 36 for the first machine learning model 50, such as a temperature hyperparameter value.

Additionally or alternatively, the prompt generation input 30 may further include metadata associated with the prompt input data 32. In the example of FIG. 1, the one or more processing devices 14 are further configured to receive temporal metadata 38 associated with the prompt input data 32. For example, the temporal metadata 38 may include a timestamp that indicates a time at which the prompt input data 32 is received. The prompt generation input 30 may additionally or alternatively include temporal metadata 38 associated respective portions of the prompt input data 32, such as timestamps in a meeting transcript indicating times at which different utterances were spoken.

In some examples, the prompt generation input 30 may additionally or alternatively include compilation instruction metadata 39 associated with one or more portions of the prompt input data 32. The compilation instruction metadata 39 may specify that different portions of the prompt input data 32 are processed differently at the prompt compiler 40. For example, the compilation instruction metadata 39 may specify that a first portion of the prompt input data 32 is included verbatim in the compiled prompt 44, whereas a second portion of the prompt input data 32 may be modified.

The one or more processing devices 14 are further configured to execute a prompt compiler 40 at which the compiled prompt 44 is constructed based at least in part on the prompt input data 32. The prompt compiler 40 includes fragment and template selection logic 42 at which the one or more processing devices 14 are configured to select a prompt template 26 and one or more of the prompt fragments 22 from the prompt library 20. By executing the fragment and template selection logic 42, the one or more processing devices 14 are configured to extract relevant information from the prompt generation input 30 and use that information to select the prompt template 26 and one or more prompt fragments 22, as discussed in further detail below according to several examples.

In examples in which temporal metadata 38 is included in the prompt generation input 30, the one or more processing devices 14 may be configured to select the one or more prompt fragments 22 at the prompt compiler 40 based at least in part on the temporal metadata 38. For example, the prompt generation input 30 may include temporal metadata 38 indicating that the prompt input data 32 includes logs of multiple chat sessions occurring at different times. In an example in which the prompt input data 32 further includes an instruction to summarize the chat logs, the prompt compiler 40 may generate a compiled prompt 44 that includes respective prompt fragments 22 associated with the chat sessions. The prompt fragments 22 may be instructions to generate respective summaries of those chat sessions.

At the prompt compiler 40, the one or more processing devices 14 are further configured to fill the selected prompt template 26 with the prompt input data 32 and the one or more selected prompt fragments 22 to compute the compiled prompt 44. In some examples, constructing the compiled prompt 44 may include interspersing prompt fragments 22 and portions of the prompt input data 32, such as to label different sections of a document that are indicated to be processed differently at the first machine learning model 50.

The one or more processing devices 14 are further configured to process the compiled prompt 44 at the first machine learning model 50 to compute a machine learning model output 52. In the example of FIG. 1, the machine learning model output 52 includes one or more output tokens 54. Additionally or alternatively, the machine learning model output 52 may include other types of data such as image, audio, or video data. The one or more processing devices 14 are further configured to output the machine learning model output 52. For example, the machine learning model output 52 may be output to the GUI 34 for display to the user.

Figure 2:
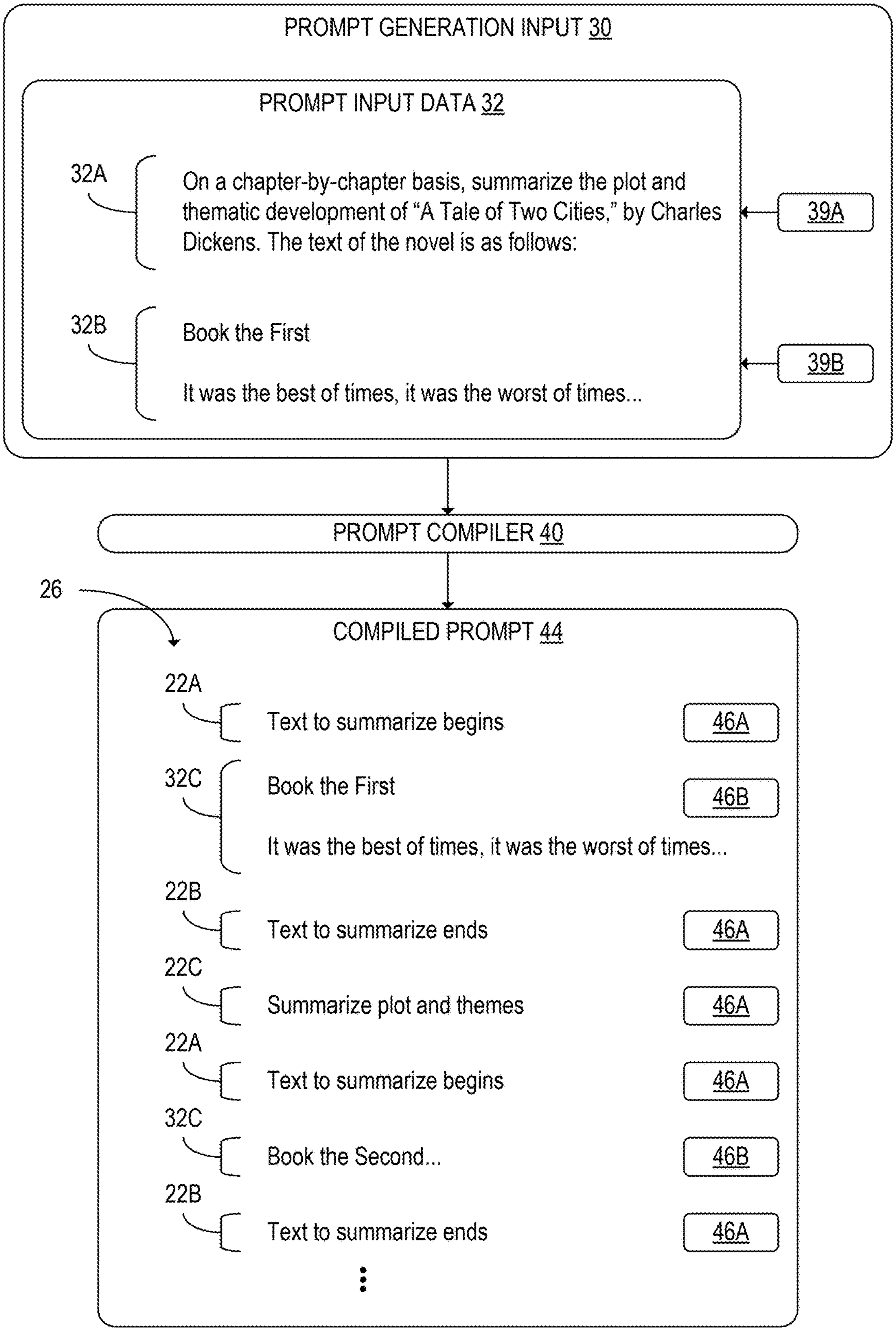
FIG. 2 schematically depicts an example in which a compiled prompt is generated, according to the example of FIG. 1.

FIG. 2 schematically depicts an example in which a compiled prompt 44 is generated. In the example of FIG. 2, the prompt input data 32 includes summarization instructions 32A and a summarization target 32B. The summarization instructions 32A state "On a chapter-by-chapter basis, summarize the plot and thematic development of 'A Tale of Two Cities,' by Charles Dickens. The text of the novel is as follows:". The summarization target 32B includes the full text of A Tale of Two Cities.

In the example of FIG. 2, the summarization instructions 32A and the summarization target 32B respectively have first compilation instruction metadata 39A and second compilation instruction metadata 39B. The first compilation instruction metadata 39A specifies that the summarization instructions 32A can be replaced with one or more prompt fragments 22, whereas the second compilation instruction metadata 39B specifies that the full text of the summarization target 32B will be included in the compiled prompt 44.

The one or more processing devices 14 are further configured to process the prompt generation input 30 at the prompt compiler 40 to compute the compiled prompt 44. The compiled prompt 44 divides the summarization target 32B into summarization target fragments 32C corresponding to different sections of A Tale of Two Cities. The compiled prompt 44 further includes a plurality of prompt fragments 22 that indicate how the summarization target fragments 32C are processed. Three different prompt fragments 22A, 22B, and 22C are shown in the example of FIG. 2, with these prompt fragments respectively stating, "Text to summarize begins," "Text to summarize ends," and "Summarize plot and themes." The summarization target fragments 32C and the prompt fragments 22 are arranged according to a prompt template 26 selected at the prompt compiler 40.

In the example of FIG. 2, at the prompt compiler 40, the one or more processing devices 14 are further configured to assign prompt fragment metadata 46A to the plurality of prompt fragments 22. The prompt fragment metadata 46A distinguishes the prompt fragments 22 from the prompt input data 32. The one or more processing devices 14 are further configured to assign prompt input metadata 46B to the prompt input data 32 included in the compiled prompt 44. The prompt fragment metadata 46A and the prompt input metadata 46B may, for example, include provenance metadata indicating respective data sources of the corresponding portions of the compiled prompt 44.

At the first machine learning model 50, the one or more processing devices 14 may be further configured to process the prompt fragments 22 in a manner that differs from the processing of the prompt input data 32, as indicated by the prompt fragment metadata 46A. For example, the prompt fragment metadata 46A may indicate that the one or more prompt fragments 22 are modifiable when those one or more prompt fragments 22 are processed at the first machine learning model 50 or when pre- or post-processing is applied to them. In contrast, the prompt input metadata 46B may indicate that the prompt input data 32 is reproduced in the form of exact quotes when portions of the prompt input data 32 are included in the machine learning model output 52. This exact quoting may bypass the first machine learning model 50 in some examples. Thus, hallucination of portions of the prompt input data 32 may be avoided.

Figure 3:
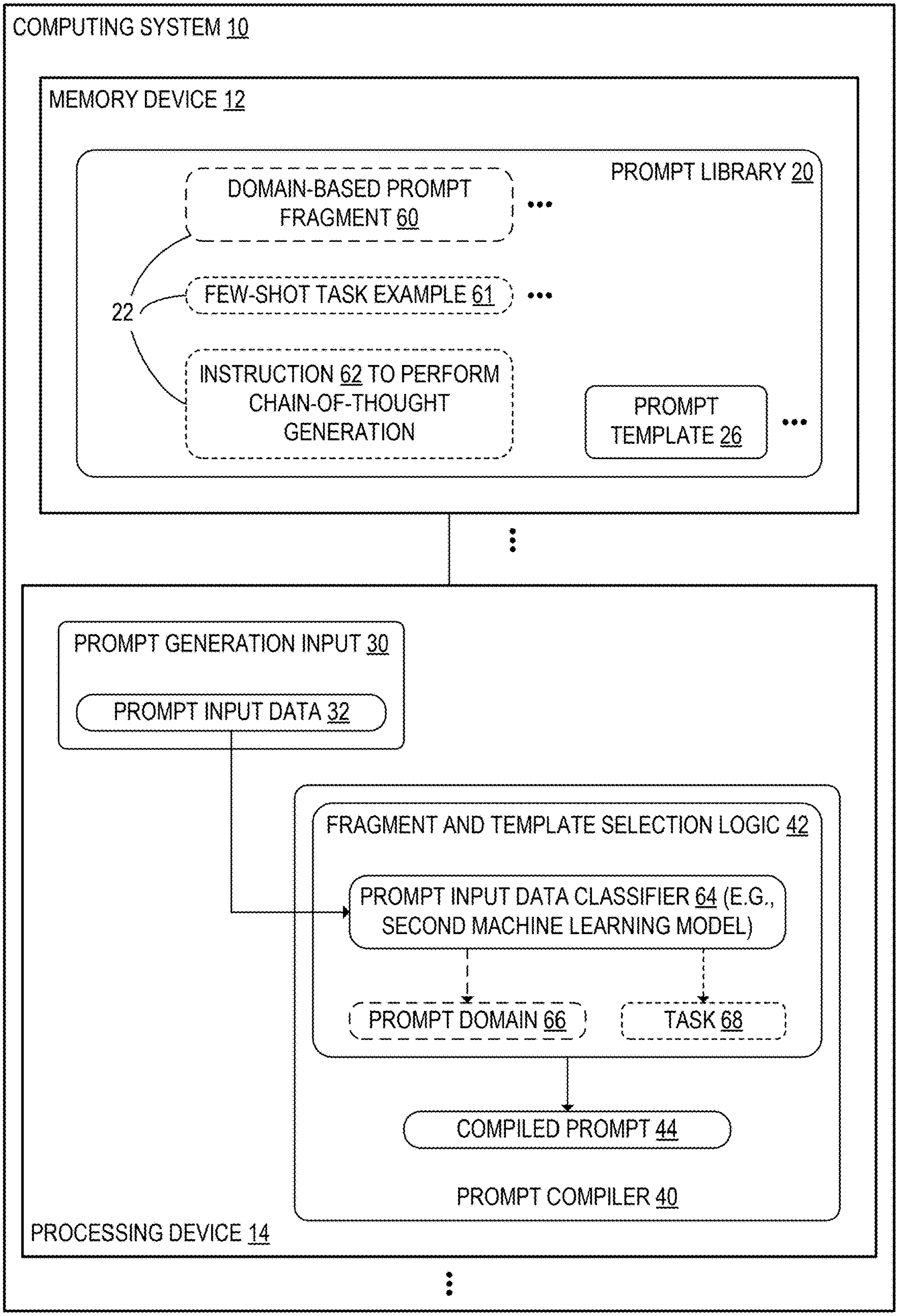
FIG. 3 schematically shows examples of different types of prompt fragments that may be included in a prompt library and inserted into a prompt template during prompt compilation, according to the example of FIG. 1.

FIG. 3 schematically shows examples of different types of prompt fragments 22 that may be included in the prompt library 20. In some examples, the prompt library 20 may include a plurality of domain-based prompt fragments 60 among the plurality of prompt fragments 22. The domain-based prompt fragments 60 are prompt fragments 22 that are specialized for different subject matter areas. For example, the prompt library 20 may include sets of domain-based prompt fragments 60 that are associated with different respective programming languages. As another example, the prompt library 20 may include sets of prompt fragments 22 that are associated with different scientific fields.

In examples in which the prompt library 20 includes domain-based prompt fragments 60, the one or more processing devices 14 may be further configured to identify a prompt domain 66 associated with the prompt input data 32 at the prompt compiler 40. The prompt domain 66 may be identified at a prompt input data classifier 64 included in the fragment and template selection logic 42. The prompt input data classifier 64 may be a second machine learning model in some examples. In examples in which the one or more processing devices 14 are configured to identify a prompt domain 66, the one or more processing devices 14 are further configured to select one or more of the domain-based prompt fragments 60 that match the prompt domain 66 for inclusion in the compiled prompt 44.

In some examples, as shown in FIG. 3, the prompt library 20 may include a plurality of few-shot task examples 61 among the plurality of prompt fragments 22. The few-shot task examples 61 are example input-output pairs for specific processing tasks that the compiled prompt 44 may instruct the first machine learning model 50 to perform.

At the prompt compiler 40, in examples in which the prompt library 20 includes a plurality of few-shot task examples 61, the one or more processing devices 14 may be further configured to determine a task 68 specified by the prompt input data 32. The task 68 may be computed at the prompt input data classifier 64 as a classification output. The one or more processing devices 14 may be further configured to select one or more of the few-shot task examples 61 associated with the task 68 for inclusion in the compiled prompt 44. Thus, the one or more processing devices 14 may be configured to select one or more few-shot task examples 61 that have a high probability of accurately reflecting a task specified by the user in the prompt input data 32.

In some examples, the plurality of prompt fragments 22 may include an instruction 62 to perform chain-of-thought generation when computing the machine learning model output 52. Accordingly, the first machine learning model 50 may be configured to compute the machine learning model output 52 with a chain-of-thought structure when such an instruction 62 is included in the compiled prompt 44. In chain-of-thought generation, a machine learning model is prompted to output descriptions of preliminary steps in a sequence of logical inferences. The machine learning model accordingly uses at least a portion of its context window to store previous steps of the logical sequence. One example instruction that may be included in a prompt to elicit chain-of-though generation is "Work through the question step by step." Chain-of-thought prompt engineering techniques may increase the accuracy of results of multi-step logical inference when the first machine learning model 50 generates the machine learning model output 52.

Figure 4:
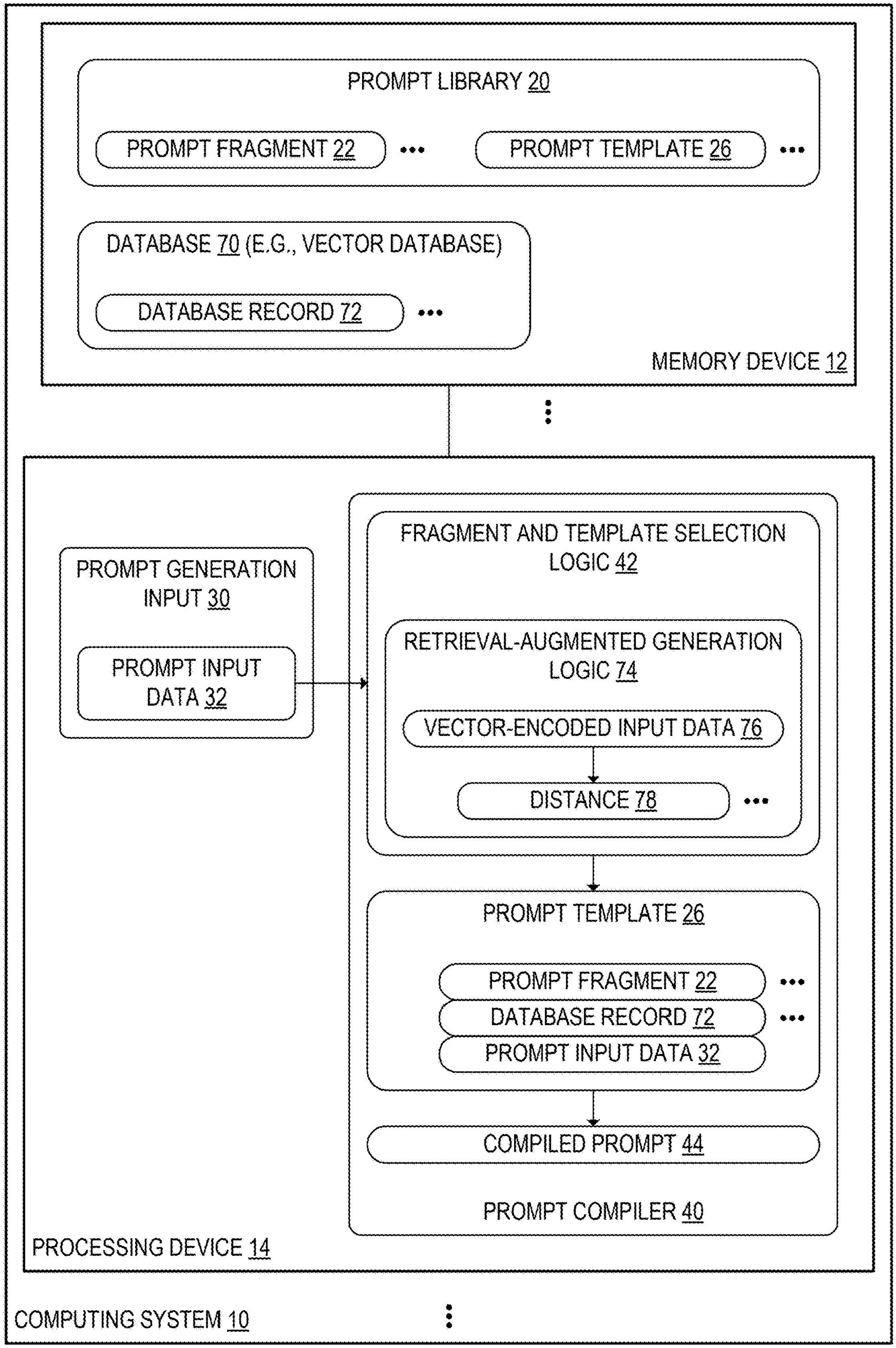
FIG. 4 schematically shows the computing system according to an example in which the one or more processing devices are configured to perform retrieval-augmented generation when generating the compiled prompt, according to the example of FIG. 1.

FIG. 4 schematically shows the computing system 10 according to an example in which the one or more processing devices 14 are configured to perform retrieval-augmented generation (RAG). In the example of FIG. 4, the fragment and template selection logic 42 includes RAG logic 74. When generating the compiled prompt 44 in the example of FIG. 4, the one or more processing devices 14 are configured to retrieve a database record 72 from a database 70 via RAG. For example, the database 70 may be a vector database in which the database records 72 are stored in vectorized form. The RAG logic 74 may be configured to encode at least a portion of the prompt input data 32 to obtain vector-encoded input data 76 located within the same vector space as the database records 72. The RAG logic 74 may be further configured to compute respective distances 78 between the vector-encoded input data 76 and a plurality of the database records 72, and to select a database record 72 with a shortest distance 78. For example, the distances 78 may be L2 distances or cosine similarities. The one or more processing devices 14 may be further configured to insert the selected database record 72 into the prompt template 26. Thus, the database records 72 are used as prompt fragments 22 in the example of FIG. 4.

Figure 5:
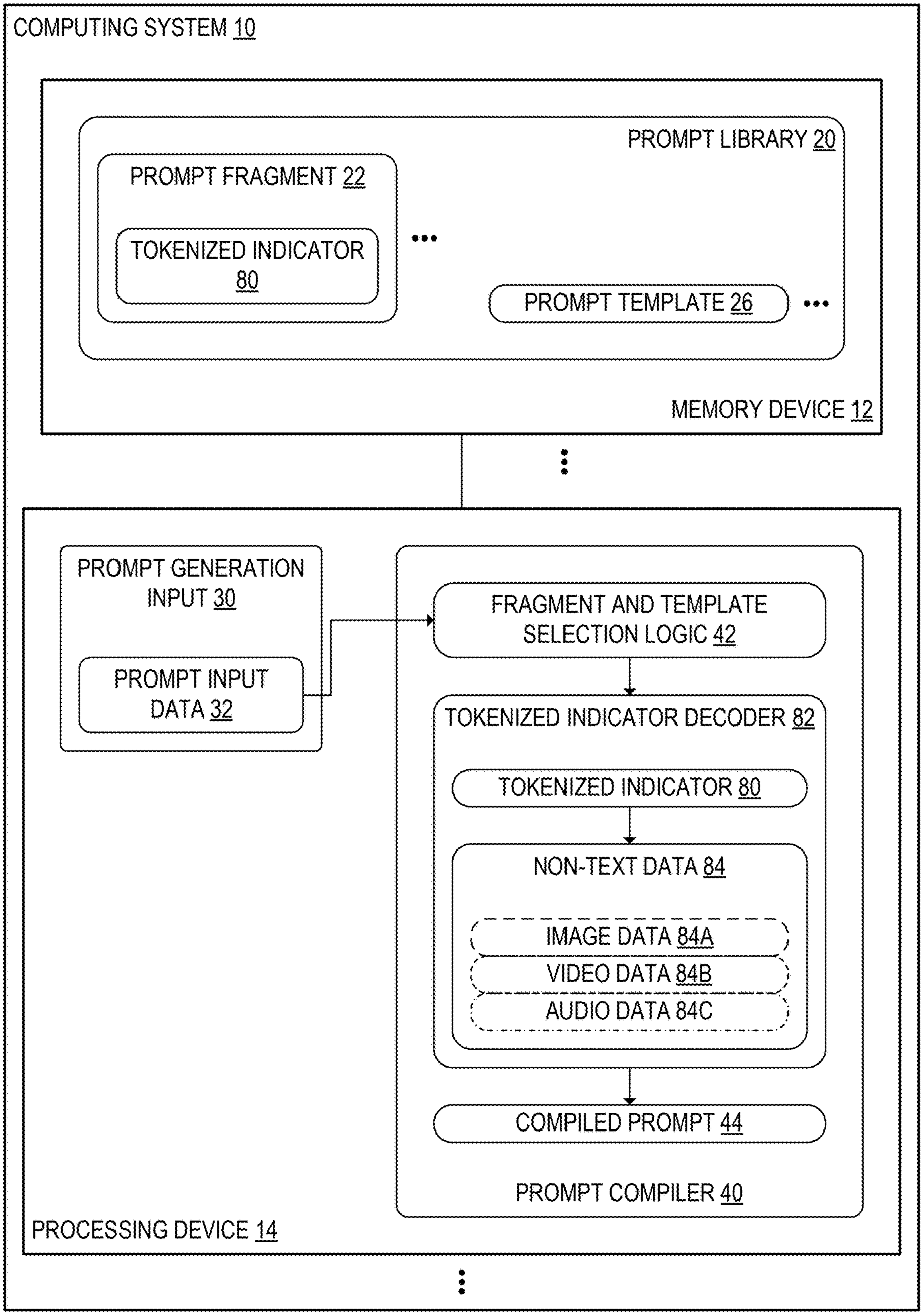
FIG. 5 schematically shows the computing system in an example in which the one or more processing devices are configured to insert non-text data into the prompt template, according to the example of FIG. 1.

FIG. 5 schematically shows the computing system 10 in an example in which the one or more processing devices 14 are configured to insert non-text data 84 into the prompt template 26. In the example of FIG. 5, at least one prompt fragment 22 of the one or more selected prompt fragments 22 includes a tokenized indicator 80 that encodes the non-text data 84. For example, the non-text data 84 may be image data 84A, video data 84B, or audio data 84C. Other types of non-text data 84 may be expressed with the tokenized indicator 80 in other examples. The prompt compiler 40 in the example of FIG. 5 further includes a tokenized indicator decoder 82. At the tokenized indicator decoder 82, the one or more processing devices 14 are further configured to decode the tokenized indicator to obtain the non-text data 84. The one or more processing devices 14 are further configured to insert the non-text data 84 into the prompt template 26. The compiled prompt 44 may accordingly be a multimodal prompt that includes image data 84A, video data 84B, and/or audio data 84C additionally or alternatively to text.

Figure 6:
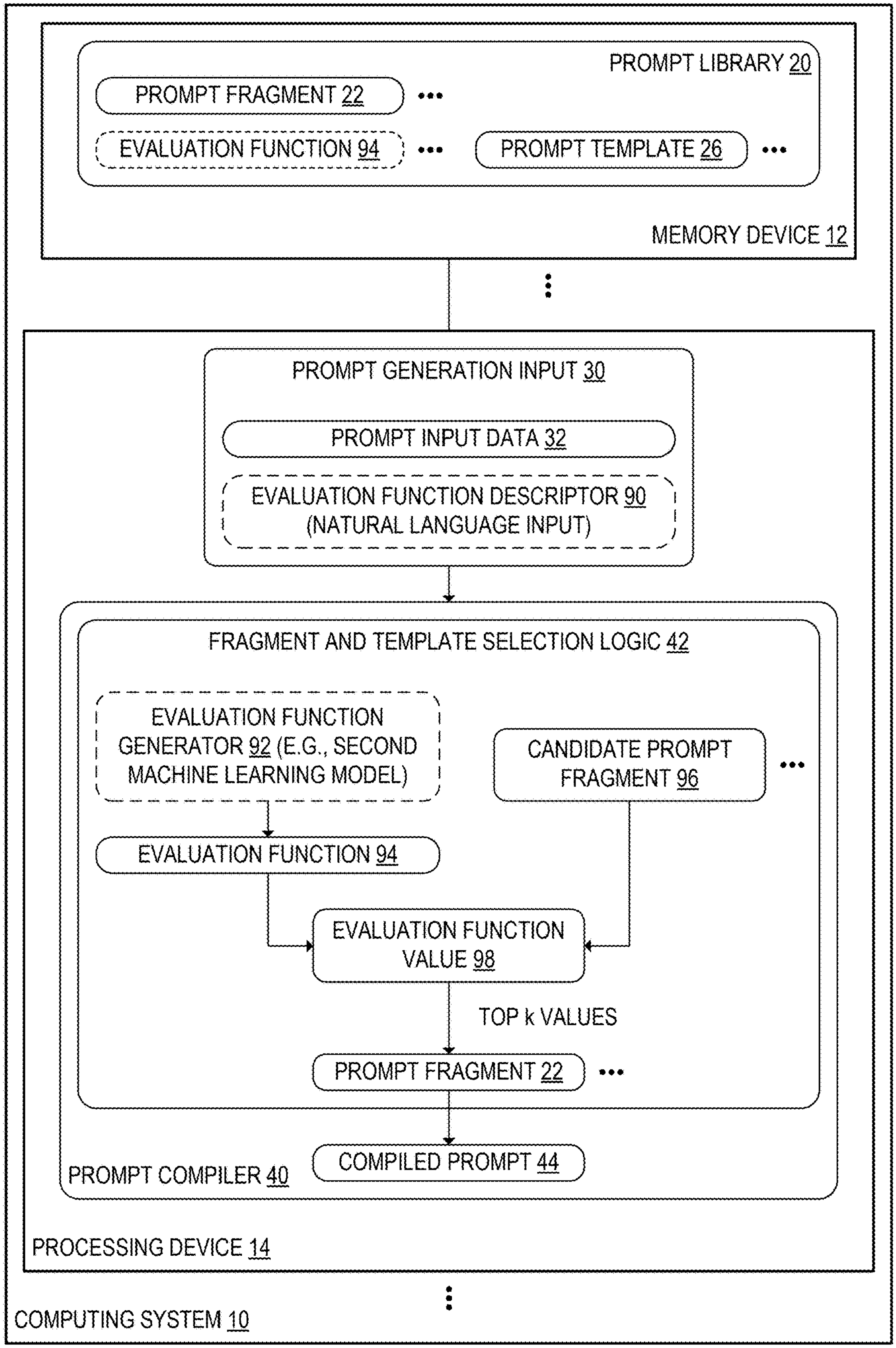
FIG. 6 schematically shows the computing system in an example in which an evaluation function is used to select the one or more prompt fragments, according to the example of FIG. 1.

FIG. 6 schematically shows the computing system 10 in an example in which an evaluation function 94 is used at the prompt compiler 40 to select the one or more prompt fragments 22. At the prompt compiler 40, according to the example of FIG. 6, the one or more processing devices 14 are further configured to obtain an evaluation function 94. For example, the evaluation function 94 may be input to the one or more processing devices 14 as user input. As another example, the evaluation function 94 may be retrieved from the prompt library 20. In examples in which the evaluation function 94 is retrieved from the prompt library 20, the evaluation function 94 may be selected at least in part by identifying a prompt domain 66 or a task 68 as discussed above with reference to FIG. 3. The evaluation function 94 may be a loss function or a reward function. For example, the evaluation function 94 may be a loss function proportional to an embedding space distance from an embedding space location associated with a specific prompt domain 66 or task 68.

In some examples, in order to obtain the evaluation function 94, the one or more processing devices 14 may be further configured to receive an evaluation function descriptor 90 at the prompt compiler 40 as a natural language input. This evaluation function descriptor 90 may be entered by the user at the GUI 34. For example, the evaluation function descriptor 90 may state, "include few-shot examples of identifying off-by-one errors in Python code." As another example, the evaluation function descriptor 90 may state, "use prompt fragments designed for inputs that include chemical formulas." The evaluation function descriptor 90 may combine multiple evaluation criteria in some examples, such as "request a numerical probability using the applicable prompt fragment that includes the fewest tokens."

The one or more processing devices 14 may be further configured to input the evaluation function descriptor 90 into an evaluation function generator 92, which may be a second machine learning model. In some examples, the first machine learning model 50 may be used as the evaluation function generator 92. At the evaluation function generator 92, the one or more processing devices 14 are further configured to compute the evaluation function 94 based at least in part on the evaluation function descriptor 90. Thus, a user who does not know the contents of the prompt library 20 or the details of the prompt fragment selection process may still specify evaluation criteria by which the one or more prompt fragments 22 are selected.

Using the evaluation function 94, the one or more processing devices 14 are further configured to compute a plurality of evaluation function values 98 of the evaluation function 94 associated with a respective plurality of candidate prompt fragments 96 included among the plurality of prompt fragments 22 in the prompt library 20. The one or more processing devices 14 are further configured to identify, as the one or more selected prompt fragments 22, one or more of the candidate prompt fragments 96 that have a predetermined number k of top evaluation function values 98. For example, the one or more processing devices 14 may be configured to select the candidate prompt fragment 96 with the highest evaluation function value 98 in examples in which k=1. Alternatively, such as when inserting few-shot task examples 61 into the prompt template 26, a higher value of k may be used.

Although, in the above discussion, the evaluation function 94 is used to select the one or more prompt fragments 22, the evaluation function 94 or another evaluation function may additionally or alternatively be used to select the prompt template 26.

Figure 7A:
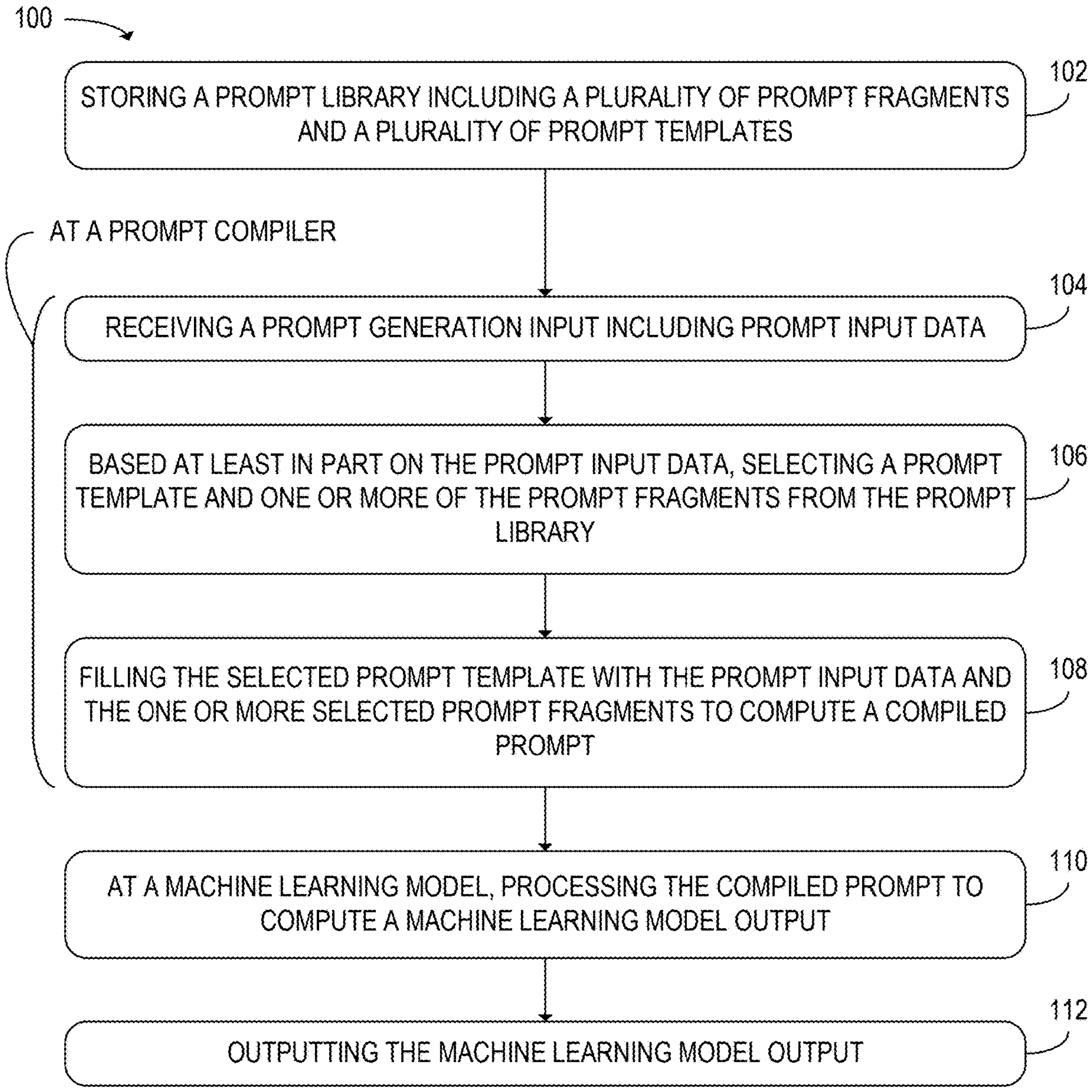
FIG. 7A schematically shows a flowchart of a method for use with a computing system to compile and process a prompt, according to the example of FIG. 1.

FIG. 7A schematically shows a flowchart of a method 100 for use with a computing system to compile and process a prompt. At step 102, the method 100 includes storing a prompt library including a plurality of prompt fragments and a plurality of prompt templates. The prompt library is stored in one or more memory devices included in the computing system. Each of the prompt fragments may include one or more input tokens.

Steps 104, 106, and 108 of the method 100 are performed at a prompt compiler. At step 104, the method 100 further includes receiving a prompt generation input including prompt input data. In some examples, the prompt generation input may be a user input entered at a GUI. The prompt input data may include one or more input tokens. Additionally or alternatively, the prompt input data may include non-text data such as image data, video data, or audio data. In some examples, additional data such as a hyperparameter setting or metadata associated with the prompt input data may also be included in the prompt generation input.

At step 106, based at least in part on the prompt input data, the method 100 further includes selecting a prompt template and one or more of the prompt fragments from the prompt library. The prompt template and the one or more prompt fragments may be selected at fragment and template selection logic included in the prompt compiler, which extracts information relevant to prompt fragment and template selection from the prompt generation input and retrieves one or more corresponding prompt fragments and a prompt template from the prompt library. For example, a second machine learning model may be included in the fragment and template selection logic.

At step 108, the method 100 further includes filling the selected prompt template with the prompt input data and the one or more selected prompt fragments to compute a compiled prompt. The prompt template accordingly specifies a structure in which the one or more selected prompt fragments and the prompt input data are arranged. In some examples, the compiled prompt is a megaprompt that includes hundreds of thousands or millions of tokens.

At step 110, the method 100 further includes processing the compiled prompt at a machine learning model to compute a machine learning model output. The machine learning model may be an LLM or an LMM. The machine learning model can be a generative LLM or LMM having billions of parameters, such as GPT 3.5, GPT-4, GPT-4o, ORCA-2, or LLaMA-2, as some specific examples. The machine learning model may, for example, use a transformer architecture or a Mamba architecture. At step 112, the method 100 further includes outputting the machine learning model output. For example, the machine learning model output may be presented to the user at the GUI. The computing system may accordingly compile and process a prompt that would be very time-consuming for a user to input.

Figure 7B:
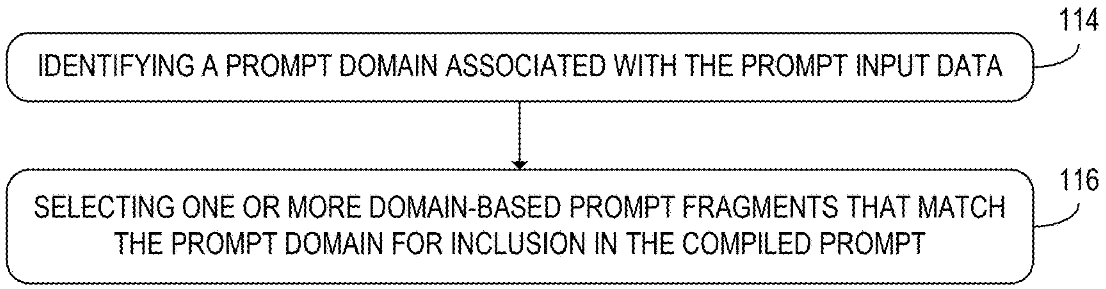
FIGS. 7B-7H show additional steps of the method of FIG. 7A that may be performed in some examples.

FIGS. 7B-7H show additional steps of the method 100 of FIG. 7A that may be performed in some examples. FIG. 7B shows steps that may be performed at the prompt compiler. In the example of FIG. 7B, the prompt library includes a plurality of domain-based prompt fragments among the plurality of prompt fragments. Each of these domain-based prompt fragments may be tagged with an indicator of its corresponding domain, such as a specific programming language or academic field. At step 114, the method 100 may further include identifying a prompt domain associated with the prompt input data. The prompt domain may be identified at a prompt input data classifier included in the fragment and template selection logic, which may be a second machine learning model. At step 116, the method 100 may further include selecting one or more of the domain-based prompt fragments that match the prompt domain for inclusion in the compiled prompt.

Figure 7C:
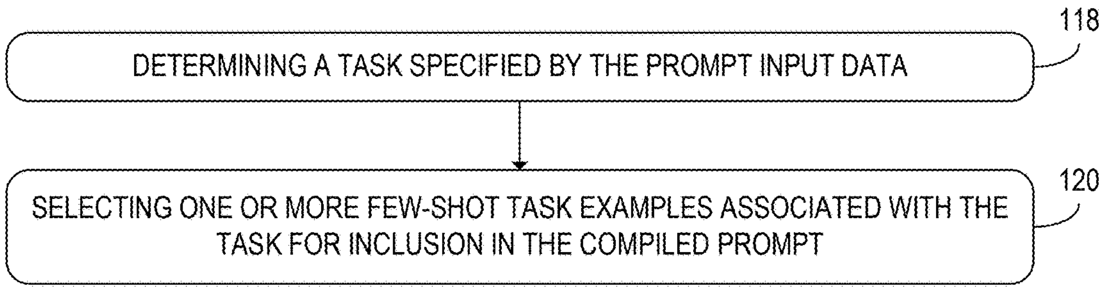

FIG. 7C shows steps of the method 100 that may be performed at the prompt compiler in examples in which the prompt library includes a plurality of few-shot task examples among the plurality of prompt fragments. At step 118, the method 100 may further include determining a task specified by the prompt input data. The task may also be identified at the prompt input data classifier. At step 120, the method 100 may further include selecting one or more of the few-shot task examples associated with the task for inclusion in the compiled prompt. Thus, the prompt compiler programmatically identifies a task specified by the user and adds one or more examples of that task to the compiled prompt.

Figure 7D:
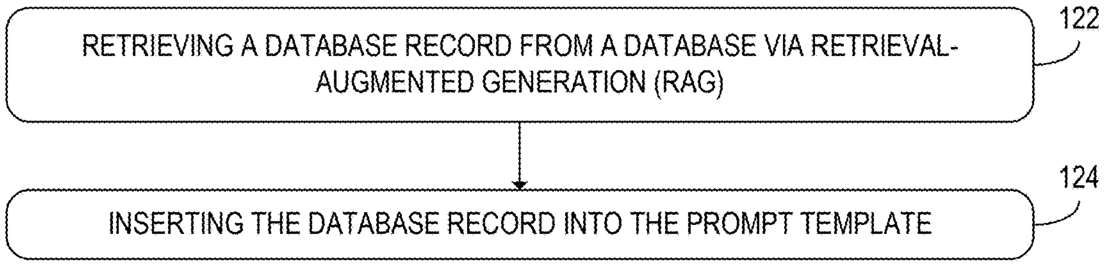

FIG. 7D shows additional steps of the method 100 that may be performed at the prompt compiler in some examples. At step 122, the method 100 may further include retrieving a database record from a database via retrieval-augmented generation (RAG). In the example of FIG. 7D, the database record may be stored in the database in vectorized form. When RAG is performed, RAG logic included in the fragment and template selection logic may compute vector-encoded input data based at least in part on the prompt input data and may compute respective distances between the vector-encoded input data and different database records stored in the database. The retrieved database record may be a database record with a shortest distance to the vector-encoded input data. At step 124, the method 100 may further include inserting the database record into the prompt template. The database record may accordingly be used as a prompt fragment when constructing the compiled prompt.

Figure 7E:
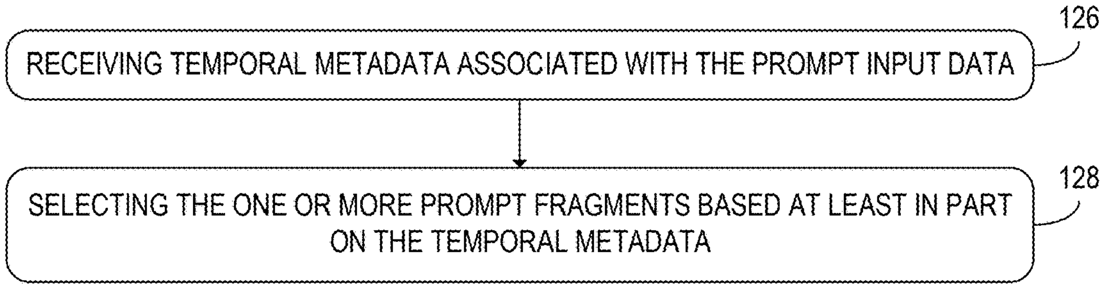

FIG. 7E shows additional steps of the method 100 that may be performed in some examples. At step 126, the method 100 may further include receiving temporal metadata associated with the prompt input data. The temporal metadata may include one or more timestamps associated with portions of the prompt input data (e.g., utterances in a transcript) or with the prompt input data as a whole. At step 128, the method 100 may further include selecting the one or more prompt fragments based at least in part on the temporal metadata. For example, the temporal metadata may indicate divisions of the prompt input data into multiple sections, and the prompt compiler may select respective prompt fragments associated with those sections. As another example, the prompt compiler may identify, from the temporal metadata, that the prompt input data was received at a time at which a regularly scheduled task typically occurs. The prompt input data classifier may, in such examples, use that temporal metadata as an additional input when performing task classification.

Figure 7F:
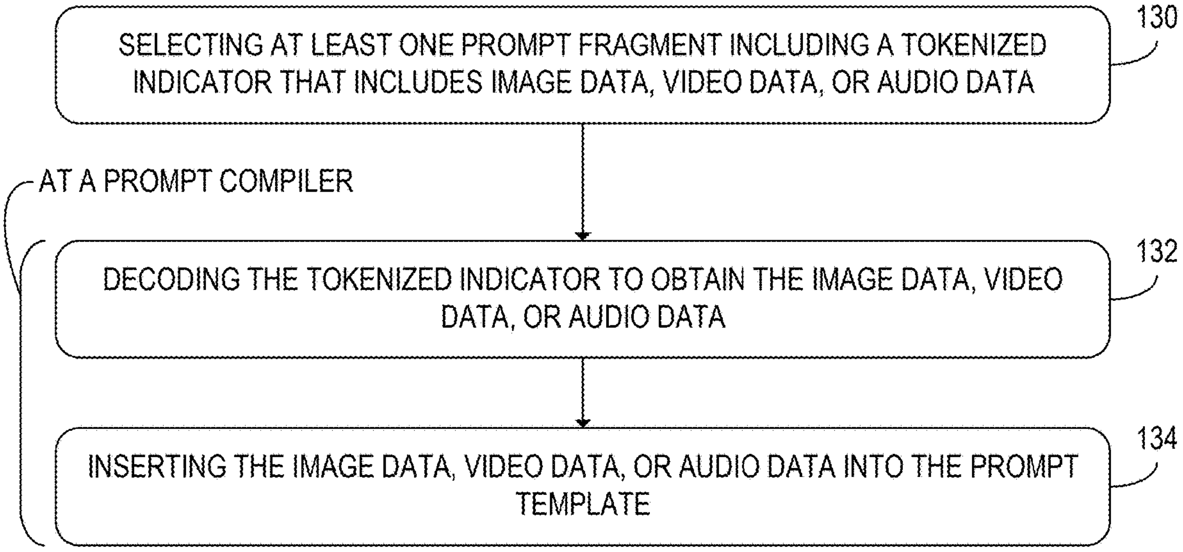

FIG. 7F shows additional steps of the method 100 that may be performed in examples in which the machine learning model is a multimodal model. At step 130, the method 100 may further include selecting at least one prompt fragment including a tokenized indicator that encodes image data, video data, or audio data. Steps 132 and 134 may then be performed at the prompt compiler. At step 132, the method 100 may further include decoding the tokenized indicator to obtain the image data, video data, or audio data. At step 134, the method 100 may further include inserting the image data, video data, or audio data into the prompt template. Thus, non-text data may be included in the compiled prompt.

Figure 7G:
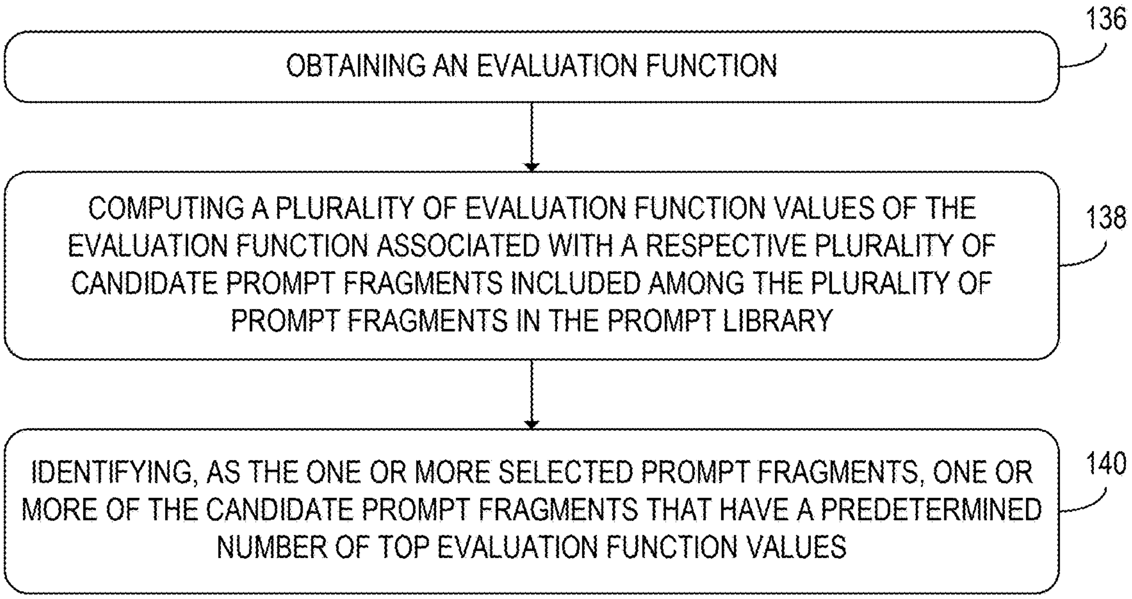

FIG. 7G shows additional steps of the method 100 that may be performed in some examples at the prompt compiler. At step 136, the method 100 may further include obtaining an evaluation function. For example, the evaluation function may be received as user input as part of the prompt generation input. In some examples, the evaluation function is included among a plurality of predefined evaluation functions stored in the prompt library. In other examples, the evaluation function may be computed from a natural language input at a second machine learning model.

At step 138, the method 100 may further include computing a plurality of evaluation function values of the evaluation function associated with a respective plurality of candidate prompt fragments included among the plurality of prompt fragments in the prompt library. At step 140, the method 100 may further include identifying, as the one or more selected prompt fragments, one or more of the candidate prompt fragments that have a predetermined number of top evaluation function values. The predetermined number may, for example, be received as user input and included in the prompt generation input. Accordingly, in examples in which the steps of FIG. 7G are performed, prompt fragments are selected for inclusion in the compiled prompt according to their scores on the evaluation function.

Figure 7H:
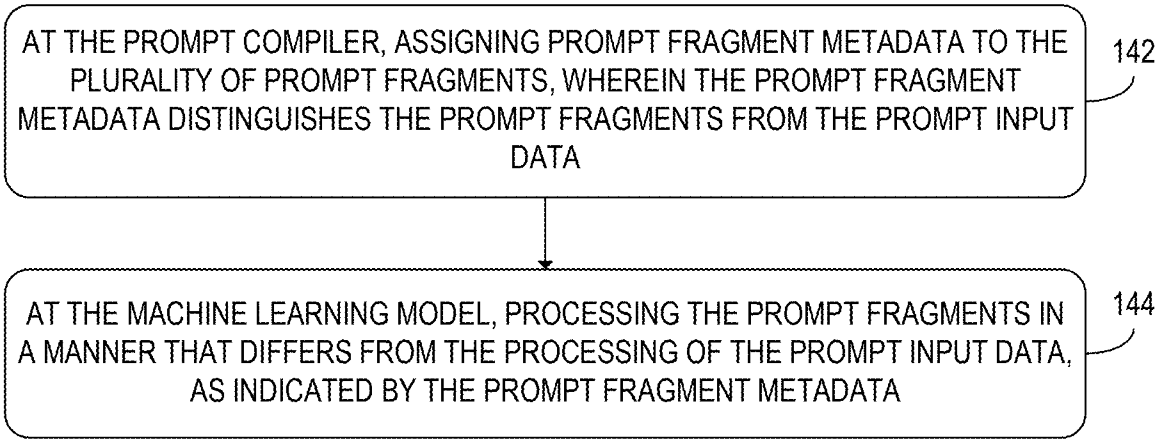

FIG. 7H shows additional steps of the method 100 that may be performed in some examples. At step 142, the method 100 may further include assigning prompt fragment metadata to the plurality of prompt fragments at the prompt compiler. The prompt fragment metadata distinguishes the prompt fragments from the prompt input data. In some examples, prompt input metadata may be assigned to the prompt input data. At step 144, the method 100 may further include at the machine learning model, processing the prompt fragments in a manner that differs from the processing of the prompt input data, as indicated by the prompt fragment metadata. For example, the prompt fragment metadata may tag the prompt fragments as modifiable, whereas the prompt input metadata may tag the prompt input data for exact quotation when reproduced in the output of the machine learning model.

Using the systems and methods discussed above, a prompt is programmatically compiled for use as input to a machine learning model. This prompt is constructed using precomputed prompt fragments and a precomputed prompt template that guide the processing of prompt input data. The above systems and methods may allow the user to construct megaprompts without performing large amounts of manual prompt engineering. Thus, the above systems and methods may allow the user to take greater advantage of expanded machine learning model context windows.

The methods and processes described herein are tied to a computing system of one or more computing devices. In particular, such methods and processes can be implemented as a computer-application program or service, an application-programming interface (API), a library, and/or other computer-program product.

Figure 8:
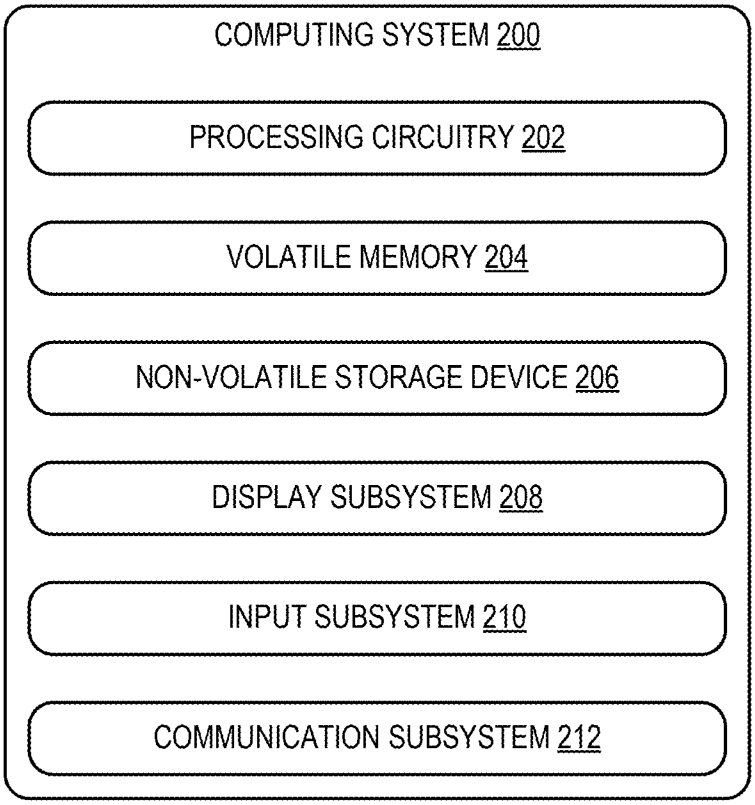
FIG. 8 shows a schematic view of an example computing environment in which the computing system of FIG. 1 may be instantiated.

FIG. 8 schematically shows a non-limiting embodiment of a computing system 200 that can enact one or more of the methods and processes described above. Computing system 200 is shown in simplified form. Computing system 200 may embody the computing system 10 described above and illustrated in FIG. 1. Components of computing system 200 may be included in one or more personal computers, server computers, tablet computers, home-entertainment computers, network computing devices, video game devices, mobile computing devices, mobile communication devices (e.g., smartphone), and/or other computing devices, and wearable computing devices such as smart wristwatches and head mounted augmented reality devices.

Computing system 200 includes processing circuitry 202, volatile memory 204, and a non-volatile storage device 206. Computing system 200 may optionally include a display subsystem 208, input subsystem 210, communication subsystem 212, and/or other components not shown in FIG. 8.

Processing circuitry 202 typically includes one or more logic processors, which are physical devices configured to execute instructions. For example, the logic processors may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors configured to execute software instructions. Additionally or alternatively, the logic processor may include one or more hardware logic circuits or firmware devices configured to execute hardware-implemented logic or firmware instructions. Processors of the processing circuitry 202 may be single-core or multi-core, and the instructions executed thereon may be configured for sequential, parallel, and/or distributed processing. Individual components of the processing circuitry 202 optionally may be distributed among two or more separate devices, which may be remotely located and/or configured for coordinated processing. For example, aspects of the computing system 200 disclosed herein may be virtualized and executed by remotely accessible, networked computing devices configured in a cloud-computing configuration. In such a case, these virtualized aspects are run on different physical logic processors of various different machines, it will be understood. These different physical logic processors of the different machines will be understood to be collectively encompassed by processing circuitry 202.

Non-volatile storage device 206 includes one or more physical devices configured to hold instructions executable by the processing circuitry to implement the methods and processes described herein. When such methods and processes are implemented, the state of non-volatile storage device 206 may be transformed e.g., to hold different data.

Non-volatile storage device 206 may include physical devices that are removable and/or built in. Non-volatile storage device 206 may include optical memory, semiconductor memory, and/or magnetic memory, or other mass storage device technology. Non-volatile storage device 206 may include nonvolatile, dynamic, static, read/write, read-only, sequential-access, location-addressable, file-addressable, and/or content-addressable devices. It will be appreciated that non-volatile storage device 206 is configured to hold instructions even when power is cut to the non-volatile storage device 206.

Volatile memory 204 may include physical devices that include random access memory. Volatile memory 204 is typically utilized by processing circuitry 202 to temporarily store information during processing of software instructions. It will be appreciated that volatile memory 204 typically does not continue to store instructions when power is cut to the volatile memory 204.

Aspects of processing circuitry 202, volatile memory 204, and non-volatile storage device 206 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 200 typically implemented in software by a processor to perform a particular function using portions of volatile memory, which function involves transformative processing that specially configures the processor to perform the function. Thus, a module, program, or engine may be instantiated via processing circuitry 202 executing instructions held by non-volatile storage device 206, using portions of volatile memory 204. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 208 may be used to present a visual representation of data held by non-volatile storage device 206. The visual representation may take the form of a GUI. As the herein described methods and processes change the data held by the non-volatile storage device, and thus transform the state of the non-volatile storage device, the state of display subsystem 208 may likewise be transformed to visually represent changes in the underlying data. Display subsystem 208 may include one or more display devices utilizing virtually any type of technology. Such display devices may be combined with processing circuitry 202, volatile memory 204, and/or non-volatile storage device 206 in a shared enclosure, or such display devices may be peripheral display devices.

When included, input subsystem 210 may comprise or interface with one or more user-input devices such as a keyboard, mouse, touch screen, camera, or microphone.

When included, communication subsystem 212 may be configured to communicatively couple various computing devices described herein with each other, and with other devices. Communication subsystem 212 may include wired and/or wireless communication devices compatible with one or more different communication protocols. As non-limiting examples, the communication subsystem may be configured for communication via a wired or wireless local- or wide-area network, broadband cellular network, etc. In some embodiments, the communication subsystem may allow computing system 200 to send and/or receive messages to and/or from other devices via a network such as the Internet.

The following paragraphs discuss several aspects of the present disclosure. According to one aspect of the present disclosure, a computing system is provided, including memory storing a prompt library. The prompt library includes a plurality of prompt fragments and a plurality of prompt templates. The computing system further includes one or more processing devices configured to, at a prompt compiler, receive a prompt generation input including prompt input data. At the prompt compiler, the one or more processing devices are further configured to, based at least in part on the prompt input data, select a prompt template and one or more of the prompt fragments from the prompt library. At the prompt compiler, the one or more processing devices are further configured to fill the selected prompt template with the prompt input data and the one or more selected prompt fragments to compute a compiled prompt. At a first machine learning model, the one or more processing devices are further configured to process the compiled prompt to compute a machine learning model output. The one or more processing devices are further configured to output the machine learning model output. The above features may have the technical effect of programmatically constructing a prompt using a precomputed prompt template and one or more precomputed fragments. For example, the above features may allow the user to take advantage of a large context window to more precisely guide the output of the machine learning model.

According to this aspect, the prompt library may include a plurality of domain-based prompt fragments among the plurality of prompt fragments. At the prompt compiler, the one or more processing devices may be further configured to identify a prompt domain associated with the prompt input data and select one or more of the domain-based prompt fragments that match the prompt domain for inclusion in the compiled prompt. The above features may have the technical effect of selecting one or more prompt fragments that are relevant to the semantic content of the prompt input data.

According to this aspect, the prompt library may include a plurality of few-shot task examples among the plurality of prompt fragments. At the prompt compiler, the one or more processing devices may be further configured to determine a task specified by the prompt input data. At the prompt compiler, the one or more processing devices may be further configured to select one or more of the few-shot task examples associated with the task for inclusion in the compiled prompt. The above features may have the technical effect of programmatically performing few-shot prompting for a specified task.

According to this aspect, at the prompt compiler, the one or more processing devices may be further configured to retrieve a database record from a database via retrieval-augmented generation (RAG). At the prompt compiler, the one or more processing devices may be further configured to insert the database record into the prompt template. The above features may have the technical effect of inserting data from a database into a prompt.

According to this aspect, at least one prompt fragment of the one or more selected prompt fragments may include a tokenized indicator that encodes image data, video data, or audio data. At the prompt compiler, the one or more processing devices may be further configured to decode the tokenized indicator to obtain the image data, video data, or audio data and insert the image data, video data, or audio data into the prompt template. The above features may have the technical effect of incorporating multimodal input into the compiled prompt.

According to this aspect, at the prompt compiler, the one or more processing devices may be further configured to receive temporal metadata associated with the prompt input data. The one or more processing devices may be further configured to select the one or more prompt fragments based at least in part on the temporal metadata. The above features may have the technical effect of generating the compiled prompt in a time-specific manner.

According to this aspect, at the prompt compiler, the one or more processing devices may be further configured to obtain an evaluation function. The one or more processing devices may be further configured to compute a plurality of evaluation function values of the evaluation function associated with a respective plurality of candidate prompt fragments included among the plurality of prompt fragments in the prompt library. The one or more processing devices may be further configured to identify, as the one or more selected prompt fragments, one or more of the candidate prompt fragments that have a predetermined number of top evaluation function values. The above features may have the technical effect of selecting the one or more prompt fragments according to their scores on a specified evaluation function.

According to this aspect, at the prompt compiler, the one or more processing devices may be further configured to receive an evaluation function descriptor as a natural language input. The one or more processing devices may be further configured to, at a second machine learning model, compute the evaluation function based at least in part on the evaluation function descriptor. The above features may have the technical effect of allowing the user to specify one or more evaluation criteria for the prompt fragments in natural language.

According to this aspect, the one or more processing devices may be further configured to, at the prompt compiler, assign prompt fragment metadata to the plurality of prompt fragments. The prompt fragment metadata may distinguish the prompt fragments from the prompt input data. At the first machine learning model, the one or more processing devices may be further configured to process the prompt fragments in a manner that differs from the processing of the prompt input data, as indicated by the prompt fragment metadata. The above features may have the technical effect of distinguishing between user input and programmatically inserted prompt fragments in the compiled prompt.

According to this aspect, the compiled prompt may include an instruction to perform chain-of-thought generation when computing the machine learning model output. The above feature may have the technical effect of prompting the machine learning model in a manner that increases the reliability of multi-step planning and logical inference.

According to another aspect of the present disclosure, a method for use with a computing system is provided. The method includes storing a prompt library including a plurality of prompt fragments and a plurality of prompt templates. The method further includes, at a prompt compiler, receiving a prompt generation input including prompt input data. The method further includes, at the prompt compiler, selecting a prompt template and one or more of the prompt fragments from the prompt library based at least in part on the prompt input data. The method further includes, at the prompt compiler, filling the selected prompt template with the prompt input data and the one or more selected prompt fragments to compute a compiled prompt. The method further includes, at a machine learning model, processing the compiled prompt to compute a machine learning model output. The method further includes outputting the machine learning model output. The above features may have the technical effect of programmatically constructing a prompt using a precomputed prompt template and one or more precomputed fragments. For example, the above features may allow the user to take advantage of a large context window to more precisely guide the output of the machine learning model.

According to this aspect, the prompt library may include a plurality of domain-based prompt fragments among the plurality of prompt fragments. At the prompt compiler, the method may further include identifying a prompt domain associated with the prompt input data. The method may further include, at the prompt compiler, selecting one or more of the domain-based prompt fragments that match the prompt domain for inclusion in the compiled prompt. The above features may have the technical effect of selecting one or more prompt fragments that are relevant to the semantic content of the prompt input data.

According to this aspect, the prompt library may include a plurality of few-shot task examples among the plurality of prompt fragments. At the prompt compiler, the method may further include determining a task specified by the prompt input data. The method may further include, at the prompt compiler, selecting one or more of the few-shot task examples associated with the task for inclusion in the compiled prompt. The above features may have the technical effect of programmatically performing few-shot prompting for a specified task.

According to this aspect, the method may further include, at the prompt compiler, retrieving a database record from a database via retrieval-augmented generation (RAG). The method may further include inserting the database record into the prompt template. The above features may have the technical effect of inserting data from a database into a prompt.

According to this aspect, at least one prompt fragment of the one or more selected prompt fragments may include a tokenized indicator that encodes image data, video data, or audio data. At the prompt compiler, the method may further include decoding the tokenized indicator to obtain the image data, video data, or audio data and inserting the image data, video data, or audio data into the prompt template. The above features may have the technical effect of incorporating multimodal input into the compiled prompt.

According to this aspect, the method may further include, at the prompt compiler, receiving temporal metadata associated with the prompt input data. The method may further include, at the prompt compiler, selecting the one or more prompt fragments based at least in part on the temporal metadata. The above features may have the technical effect of generating the compiled prompt in a time-specific manner.

According to this aspect, the method may further include, at the prompt compiler, obtaining an evaluation function. At the prompt compiler, the method may further include computing a plurality of evaluation function values of the evaluation function associated with a respective plurality of candidate prompt fragments included among the plurality of prompt fragments in the prompt library. At the prompt compiler, the method may further include identifying, as the one or more selected prompt fragments, one or more of the candidate prompt fragments that have a predetermined number of top evaluation function values. The above features may have the technical effect of selecting the one or more prompt fragments according to their scores on a specified evaluation function.

According to this aspect, at the prompt compiler, the method may further include assigning prompt fragment metadata to the plurality of prompt fragments. The prompt fragment metadata may distinguish the prompt fragments from the prompt input data. At the machine learning model, the method may further include processing the prompt fragments in a manner that differs from the processing of the prompt input data, as indicated by the prompt fragment metadata. The above features may have the technical effect of distinguishing between user input and programmatically inserted prompt fragments in the compiled prompt.

According to this aspect, the compiled prompt may include an instruction to perform chain-of-thought generation when computing the machine learning model output. The above feature may have the technical effect of prompting the machine learning model in a manner that increases the reliability of multi-step planning and logical inference.

According to another aspect of the present disclosure, a computing system is provided, including memory storing a prompt library. The prompt library includes a plurality of prompt fragments and a plurality of prompt templates. The computing system further includes one or more processing devices configured to generate a compiled prompt as an input to a first machine learning model. Generating the compiled prompt includes, at a prompt compiler, receiving a prompt generation input including prompt input data. The prompt input data is received as user input to a graphical user interface (GUI). At the prompt compiler, generating the compiled prompt further includes selecting a prompt template and one or more of the prompt fragments from the prompt library. The prompt template and the one or more prompt fragments are selected at least in part by processing the prompt generation input at a second machine learning model. Generating the compiled prompt further includes filling the selected prompt template with the prompt input data and the one or more selected prompt fragments to compute a compiled prompt. At the first machine learning model, the one or more processing devices are further configured to process the compiled prompt to compute a machine learning model output. The one or more processing devices are further configured to output the machine learning model output for display at the GUI. The above features may have the technical effect of programmatically constructing a prompt using a precomputed prompt template and one or more precomputed fragments. For example, the above features may allow the user to take advantage of a large context window to more precisely guide the output of the machine learning model.

"And/or" as used herein is defined as the inclusive or $\wedge$, as specified by the following truth table:

| A | B | $A \vee B$ |
|---|---|---|
| True | True | True |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system comprising:
- memory storing:
  - a prompt library including a plurality of prompt fragments and a plurality of prompt templates; and
  - respective embedding representations of the prompt fragments; and
- one or more processing devices configured to:
  - at a prompt compiler:
    - receive a prompt generation input including prompt input data;
    - based at least in part on the prompt input data and the embedding representations, select a prompt template and one or more of the prompt fragments from the prompt library; and
    - fill the selected prompt template with the prompt input data and the one or more selected prompt fragments to compute a compiled prompt, wherein:
      - at least one prompt fragment of the one or more selected prompt fragments includes a tokenized indicator that encodes image data, video data, or audio data; and
      - the one or more processing devices are further configured to:
        - decode the tokenized indicator to obtain the image data, video data, or audio data; and
        - insert the image data, video data, or audio data into the prompt template;
  - at a first machine learning model, process the compiled prompt to compute a machine learning model output; and
  - output the machine learning model output.

2. The computing system of claim 1, wherein:
- the prompt library includes a plurality of domain-based prompt fragments among the plurality of prompt fragments; and
- at the prompt compiler, the one or more processing devices are further configured to:
  - identify a prompt domain associated with the prompt input data; and
  - select one or more of the domain-based prompt fragments that match the prompt domain for inclusion in the compiled prompt.

3. The computing system of claim 1, wherein:
- the prompt library includes a plurality of few-shot task examples among the plurality of prompt fragments; and
- at the prompt compiler, the one or more processing devices are further configured to:
  - determine a task specified by the prompt input data; and
  - select one or more of the few-shot task examples associated with the task for inclusion in the compiled prompt.

4. The computing system of claim 1, wherein, at the prompt compiler, the one or more processing devices are further configured to:
- retrieve a database record from a database via retrieval-augmented generation (RAG); and
- insert the database record into the prompt template.

5. The computing system of claim 1, wherein, at the prompt compiler, the one or more processing devices are further configured to:
- receive temporal metadata associated with the prompt input data; and
- select the one or more prompt fragments based at least in part on the temporal metadata.

6. The computing system of claim 1, wherein, at the prompt compiler, the one or more processing devices are further configured to:
- obtain an evaluation function;
- compute a plurality of evaluation function values of the evaluation function associated with a respective plurality of candidate prompt fragments included among the plurality of prompt fragments in the prompt library; and
- identify, as the one or more selected prompt fragments, one or more of the candidate prompt fragments that have a predetermined number of top evaluation function values.

7. The computing system of claim 6, wherein, at the prompt compiler, the one or more processing devices are further configured to:
- receive an evaluation function descriptor as a natural language input; and
- at a second machine learning model, compute the evaluation function based at least in part on the evaluation function descriptor.

8. The computing system of claim 1, wherein the one or more processing devices are further configured to:
- at the prompt compiler, assign prompt fragment metadata to the plurality of prompt fragments, wherein the prompt fragment metadata distinguishes the prompt fragments from the prompt input data; and
- at the first machine learning model, process the prompt fragments in a manner that differs from the processing of the prompt input data, as indicated by the prompt fragment metadata.

9. The computing system of claim 1, wherein the compiled prompt includes an instruction to perform chain-of-thought generation when computing the machine learning model output.

10. A method for use with a computing system, the method comprising:
- storing:
  - a prompt library including a plurality of prompt fragments and a plurality of prompt templates; and
  - respective embedding representations of the prompt fragments; and
- at a prompt compiler:
  - receiving a prompt generation input including prompt input data;
  - based at least in part on the prompt input data and the embedding representations, selecting a prompt template and one or more of the prompt fragments from the prompt library; and
  - filling the selected prompt template with the prompt input data and the one or more selected prompt fragments to compute a compiled prompt, wherein:
    - at least one prompt fragment of the one or more selected prompt fragments includes a tokenized indicator that encodes image data, video data, or audio data; and filling the selected prompt template includes:
decoding the tokenized indicator to obtain the image data, video data, or audio data; and
inserting the image data, video data, or audio data into the prompt template;
at a machine learning model, processing the compiled prompt to compute a machine learning model output; and
outputting the machine learning model output.

11. The method of claim 10, wherein:
the prompt library includes a plurality of domain-based prompt fragments among the plurality of prompt fragments; and
at the prompt compiler, the method further comprises:
identifying a prompt domain associated with the prompt input data; and
selecting one or more of the domain-based prompt fragments that match the prompt domain for inclusion in the compiled prompt.

12. The method of claim 10, wherein:
the prompt library includes a plurality of few-shot task examples among the plurality of prompt fragments; and
at the prompt compiler, the method further comprises:
determining a task specified by the prompt input data; and
selecting one or more of the few-shot task examples associated with the task for inclusion in the compiled prompt.

13. The method of claim 10, further comprising, at the prompt compiler:
retrieving a database record from a database via retrieval-augmented generation (RAG); and
inserting the database record into the prompt template.

14. The method of claim 10, further comprising, at the prompt compiler:
receiving temporal metadata associated with the prompt input data; and
selecting the one or more prompt fragments based at least in part on the temporal metadata.

15. The method of claim 10, further comprising, at the prompt compiler:
obtaining an evaluation function;
computing a plurality of evaluation function values of the evaluation function associated with a respective plurality of candidate prompt fragments included among the plurality of prompt fragments in the prompt library; and
identifying, as the one or more selected prompt fragments, one or more of the candidate prompt fragments that have a predetermined number of top evaluation function values.

16. The method of claim 10, further comprising:
at the prompt compiler, assigning prompt fragment metadata to the plurality of prompt fragments, wherein the prompt fragment metadata distinguishes the prompt fragments from the prompt input data; and
at the machine learning model, processing the prompt fragments in a manner that differs from the processing of the prompt input data, as indicated by the prompt fragment metadata.

17. The method of claim 10, wherein the compiled prompt includes an instruction to perform chain-of-thought generation when computing the machine learning model output.

18. A computing system comprising:
memory storing a prompt library including a plurality of prompt fragments and a plurality of prompt templates; and
one or more processing devices configured to:
generate a compiled prompt as an input to a first machine learning model, wherein generating the compiled prompt includes, at a prompt compiler:
receiving a prompt generation input including prompt input data, wherein the prompt input data is received as user input to a graphical user interface (GUI);
selecting a prompt template and one or more of the prompt fragments from the prompt library, wherein the prompt template and the one or more prompt fragments are selected at least in part by processing the prompt generation input at a second machine learning model, wherein the second machine learning model is a prompt input data classifier; and
filling the selected prompt template with the prompt input data and the one or more selected prompt fragments to compute a compiled prompt, wherein:
at least one prompt fragment of the one or more selected prompt fragments includes a tokenized indicator that encodes image data, video data, or audio data; and
the one or more processing devices are further configured to:
decode the tokenized indicator to obtain the image data, video data, or audio data; and
insert the image data, video data, or audio data into the prompt template;
at the first machine learning model, process the compiled prompt to compute a machine learning model output; and
output the machine learning model output for display at the GUI.

* * * * *